United States Patent [19]
Dripke

[11] 3,859,848
[45] Jan. 14, 1975

[54] TEST FRAME WITH SELECTIVELY POSITIONABLE SPECIMEN HOLDERS

[75] Inventor: Manfred Dripke, Rottenacker, Germany

[73] Assignee: Zwick & Co. Kommanditgesellschaft, Einisingen, Germany

[22] Filed: July 30, 1973

[21] Appl. No.: 383,536

[30] Foreign Application Priority Data
Aug. 11, 1972 Germany............................ 2239553

[52] U.S. Cl. ........................................ 73/93, 73/103
[51] Int. Cl. ............................................. G01n 3/04
[58] Field of Search ................. 73/93, 103, 95, 15.6

[56] References Cited
UNITED STATES PATENTS
3,264,867  8/1966  Trenkenshuh .......................... 73/95
3,375,709  4/1968  Holmes .................................. 73/93

*Primary Examiner*—Jerry W. Myracle
*Attorney, Agent, or Firm*—Karl F. Ross; Herbert Dubno

[57] ABSTRACT

A test frame has a pair of horizontal and vertically spaced transverse end plates interconnected by vertically extending and parallel tie rods. An intermediate transverse horizontal plate is displaceable on these rods to test the compressive or tensile strength of a sample secured between it and one of the end plates. The intermediate plate and either or both of the end plates is formed with a throughgoing hole and each face of the plate is formed adjacent the hole with a seat adapted to snugly receive a sample holder. This holder is releasably securable to these seats so that for a long sample, for instance, one holder may be secured to the upper face of the upper plate and another to the lower face of the intermediate plate.

7 Claims, 5 Drawing Figures

TEST FRAME WITH SELECTIVELY POSITIONABLE SPECIMEN HOLDERS

FIELD OF THE INVENTION

The present invention relates to a test frame. More particularly, this invention concerns a so-called universal test frame for determining tensile and compression strength as well as for ascertaining Shore or Brinell hardness.

BACKGROUND OF THE INVENTION

A conventional type of test frame has vertically spaced lower and upper plates between which a plurality, usually four, of round-section parallel tie rods extend. A middle plate traversed by the tie rods is vertically displaced either by at least one hydraulic cylinder or threaded spindle. A sample to be tested is secured on one side to the middle plate and on the other side to either the upper or lower plate. The middle plate is then displaced toward or away from the plate to which the sample is attached, depending on whether the test is of tensile or compressive strength, and the back pressure is detected by a fluid-pressure gauge, strain gauge, or the like. For Shore hardness tests, a ball is pressed by the middle plate into the sample to be tested.

Such arrangements usually have sample-holding pins or eyes which are permanently mounted on the confronting faces of the middle plate and either or both of the end plates. If a short sample is to be connected between them the two plates are brought close together and if a larger sample is to be tested the plates It is an object of the present invention to provide an improved test frame which avoids the aforementioned drawbacks.

Another object is the provision of a test frame which can accommodate samples of various sizes.

SUMMARY OF THE INVENTION

These objects are attained according to the present invention in a test frame wherein the middle or intermediate plate is formed with an axially throughgoing hole. The upper and lower faces of the intermediate plate are formed adjacent this hole with seats adapted to receive a sample holder. Means is provided to removably secure this sample holder to either of the seats. The test device may be a force-measuring member, a cryostat, a rheometer, a drive system or the like.

According to another feature of this invention the hole in the intermediate plate is of a size that permits the sample holder and the sample or test specimen to pass so that if a long sample is to be spanned between the intermediate and upper plates the holder is secured to the bottom face of the intermediate plate.

In accordance with yet another feature of the present invention the upper plate and/or the bottom plate is also formed with a throughgoing hole similar to that of the intermediate plate so that the two sample holders can be spaced widely apart by placement on the upper face of the upper plate, for instance, and the lower face of the middle plate. Alternately a short sample can be attached between a sample holder secured to the upper face of the intermediate plate and to another holder on the lower face of the upper plate.

According to a further feature of this invention the upper plate can be fitted with an extension which on one end fits on the seat on its upper face and receives on its other end a sample holder. This arrangment allows a very long sample to be spanned in the device.

DESCRIPTION OF THE DRAWING

The above and other objects, features, and advantages of the present invention will become more readily apparent from the following description, reference being made to the accompanying drawing in which.

SPECIFIC DESCRIPTION

Figure 1:
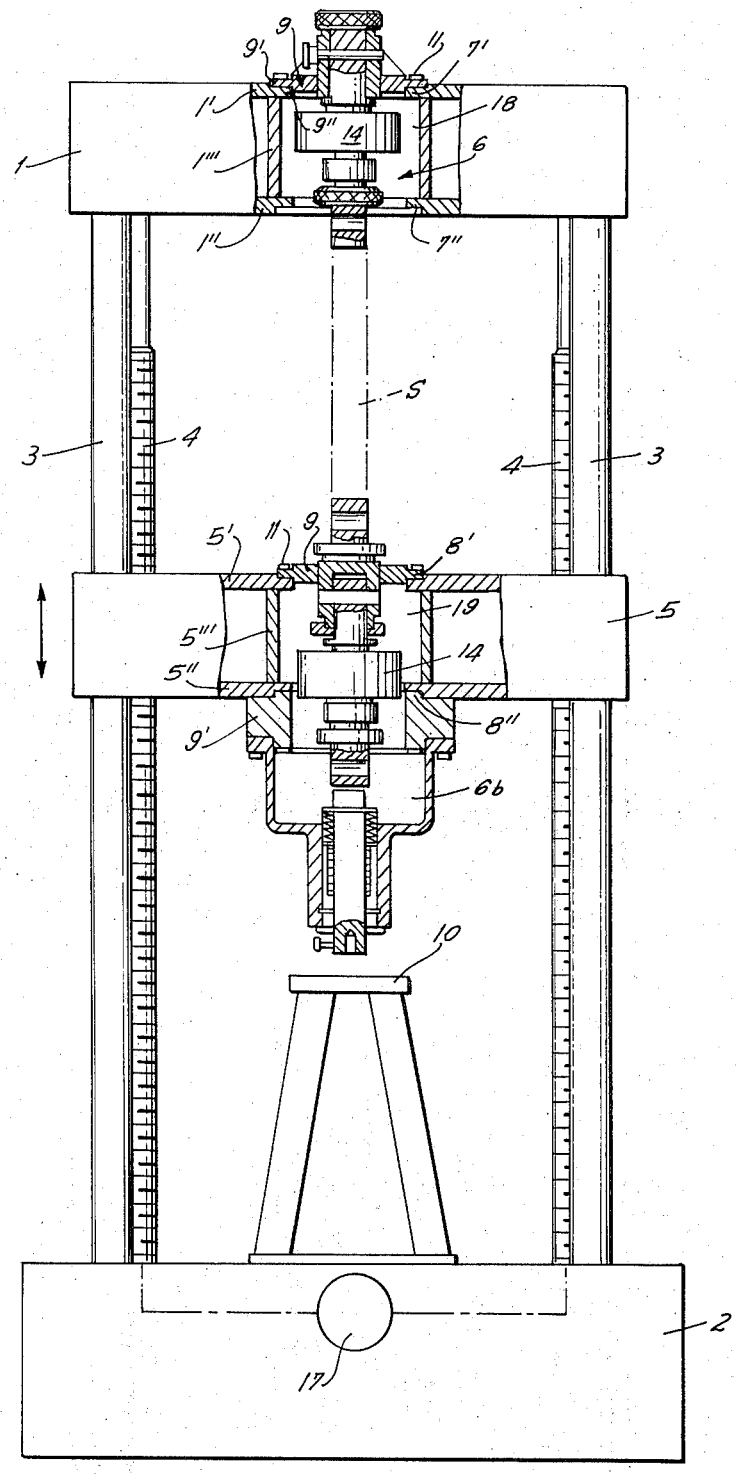
FIG. 1 is a side-elevational view, partly in section, of the apparatus according to this invention.

As shown in FIG. 1 a test frame has a fixed lower or base plate 2 from which extend frour parallel tie rods 3 whose upper ends are anchored in an upper plate 1 parallel to the base 2. A pair of threaded spindles 4 each arranged between two rods 3 extend between the plates 1 and 2. An intermediate plate 5 rides on the rods 3 and is displaceable vertically (as shown by arrow A) by the spindles 4 which are threaded into this plate 5. Both of the plate elements 1 and 5 are formed of an upper heavy steel plate 1', 5' and a lower steel plate 1", 5" separated by vertical webs 1''', 5''' imparting stiffness to the respective element 1, 5.

The stationary upper plate 1 is formed with a throughgoing vertical hole 18 and the displaceable intermediate plate 5 with an in-line similar hole 19. The upper plate 1' of upper element 1 is formed around the hole 18 with a circularly annular recess 7' constituting a seat, and its lower plate 1" is similarly formed with an identical seat 7". The upper and lower plates of the intermediate element 5 are similarly formed with respective seats 8' and 8".

A sample holder 6 known per se has a flange 9 which is shaped to be received snugly in any of the seats 7', 7", 8' or 8". This flange 9 has two faces 9' and 9" which are each formed as an annular circular setback so that the flange 9 fits very snugly with its seat. Hexagonal head bolts 11 are screwed through the flange 9 into threaded holes in the seat to secure the sample holder 6 in place.

Figure 2:
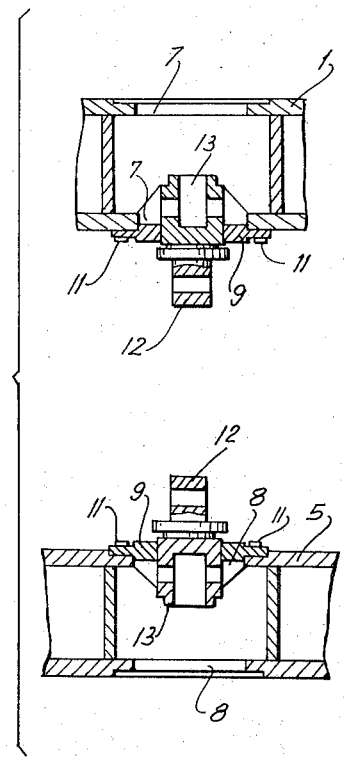
FIGS. 2 and 3 are side-sectional views illustrating alternative setups for the present invention.
Figure 3:
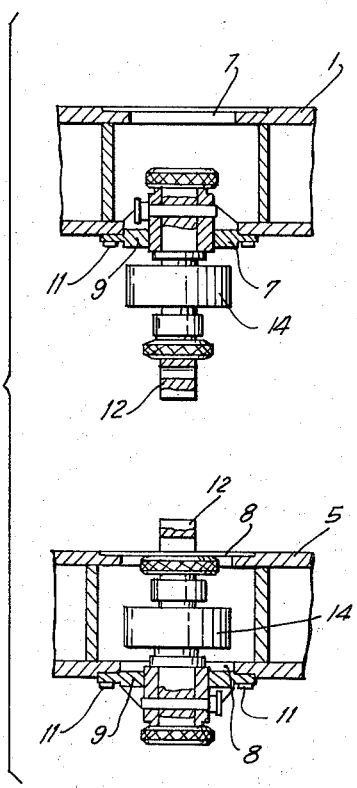

As also shown in FIGS. 2 and 3 the holder 6 can include a measuring device 14, such as a strain gauge or a hydraulic sensor, and has a connection pin 12 on one side and a connection socket 13 on the other. The holes 7 and 8 are sufficiently large to allow the device 6 to be oriented with either end 12 or 13 up. These holes also allow enough room for the sample 5 (FIG. 1) and the pressure sensor 14.

Figure 4:
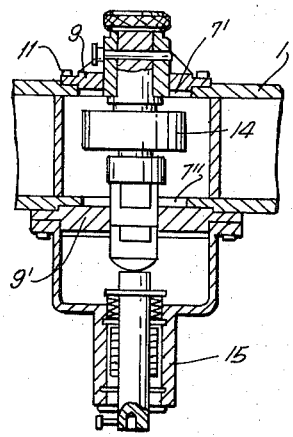
FIG. 4 is a side-sectional view of another arrangement according to this invention.

The measuring device can comprise a simple sleeve mounted on the circular flange and adapted to be connected chuckfashion to a pressure sensor 14 which in turn carries a pin 12, as shown in FIG. 1 on plate 1 and in FIG. 3. Alternately, it is possible to provide such an arrangement on one side 1' or 5' of the plate 1 or 5, as shown in FIG. 4 and FIG. 1 and provide on the other side a force-transmitter 15 having its own flange 9' that is used to test Shore hardness by pushing a ball into a sample held on a table as shown at 10 in FIG. 1. In this arrangement a single sensor 14 is responsive to forces in both directions. The sample may simply be connected between the pins 12 in an arrangement as shown in FIG. 2 that is set up for a short sample.

Figure 5:
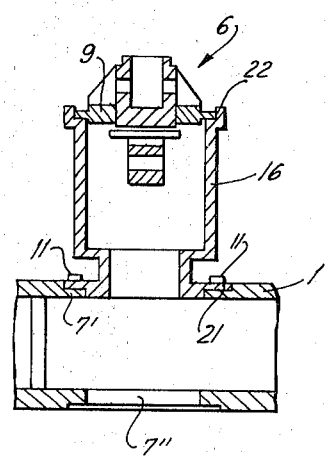
FIG. 5 is a side-sectional view of a further embodiment of the present invention.

When a long sample is to be tested it is possible to provide the upper element 1 (FIG. 5) on its upper seat 7' with a tubular extension 16 having one end 21 shaped just like the flanges 9 and adapted to be secured to this seat 7' with screws 11 and another end forming a seat 22 just like the seat 7' so that a sample holder 6 may be secured to it. This raises the holder by a distance equal to the overall axial height of the extension 16.

With such an arrangement it is possible to position the sample holders wherever the user desires for the most useful positioning of the sample.

I claim:

1. A test frame, e.g., for the tensional or compressive stressing of a specimen, comprising:
    a stationary lower transverse end element;
    a stationary upper transverse end element spaced above said lower end element;
    a plurality of parallel tie rods connected to and extending between said end elements and perpendicular thereto;
    an intermediate transverse element guided on said tie rods and having an upper face turned toward said upper element being formed with a throughgoing hole parallel to said tie rods and on both faces at said hole with a respective annular seat around said hole;
    a first sample holder selectively securable to one of said seats of said intermediate element;
    means for releasably securing said holder selectively to one of said seats;
    a second sample holder securable to at least one of said end elements vertically in line with said first holder, a test speciment being engageable with said holders;
    means for displacing said intermediate element along said rods between said elements for stressing the sample between said holders, said first sample holder being provided with a laterally extending annular flange matingly engageable with the selected seats, said first holder having on one side of said flange a connection pin and on the other side of said flange a connection sleeve.

2. A test frame, e.g., for the tensional or compressive stressing of a specimen, comprising:
    a stationary lower transverse end element;
    a stationary upper transverse end element spaced above said lower end element;
    a plurality of parallel tie rods connected to and extending between said end elements and perpendicular thereto;
    an intermediate transverse element guided on said tie rods and having an upper face turned toward said upper element and a lower face turned toward said lower element, said intermediate element being formed with a throughgoing hole parallel to said tie rods and on both faces at said hole with a respective annular seat around said hole;
    a first sample holder selectively securable to one of said seats of said intermediate element;
    means for releasably securing said holder selectively to one of said seats;
    a second sample holder securable to at least one of said end elements vertically in line with said first holder, a test speciment being engageable with said holders; and
    means for displacing said intermediate element along said rods between said elements for stressing the sample between said holders;
    a third sample holder on said intermediate element on the face opposite that carrying said first sample holder; and
    pressure-sensing means between said first and third sample holders for detecting the pressure exerted on both of them.

3. The frame defined in claim 2 wherein said first sample holder is provided with a laterally extending annular flange matingly engageable with the selected seats.

4. The frame defined in claim 2 wherein said upper element is also formed with a further throughgoing hole and has an upper face formed around said further hole with an upper annular seat and a lower face formed around said further hole with a lower annular seat, said second holder having a flange selectively receivable snugly in one of said seats of said upper element, said apparatus further comprising means for releasably securing said second holder to the selected seat of said upper element.

5. The frame defined in claim 4, further comprising an upright tubular element having a lower end engageable with said upper seat of said upper element and an upper end formed with an annular seat adapted to receive said second sample holder.

6. The frame defined in claim 4 wherein at least one of said holes is sufficiently large to accommodate said specimen.

7. A test frame for the tensional or compressive stressing of a sample, comprising:
    a stationary lower transverse and element;
    a stationary upper transverse and element spaced above said lower end element;
    a plurality of parallel tie rods connected to and extending between said end elements and perpendicular thereto;
    an intermediate transverse element guided on said tie rods and having an upper face turned toward said upper element and a lower face turned toward said lower element, said intermediate element being formed with a throughgoing hole being formed in turn at said upper face and at said lower face with respective identical upper and lower annular seats around said hole, said hole being dimensioned such that said sample can pass therethrough;
    a first sample holder formed with a flange selectively securable to one of said seats of said intermediate element;
    means for releasably securing said flange selectively to one of said seats;
    a second sample holder securable to at least one of said end elements vertically in line with said first holder, a test sample being engageable with said holders; and
    means for displacing said intermediate element along said rods between said end elements for stressing the sample between said holders.

* * * * *